United States Patent [19]

Muscat

[11] Patent Number: 4,818,009
[45] Date of Patent: Apr. 4, 1989

[54] CONVERTIBLE TOP AUTOMOBILE WITH VERTICALLY MOVABLE TAIL GATE

[76] Inventor: Peter P. Muscat, 14980 Waterfall Rd., Northville, Mich. 48167

[21] Appl. No.: 100,542

[22] Filed: Sep. 24, 1987

[51] Int. Cl.⁴ .............................. B60J 5/10; B60J 7/12
[52] U.S. Cl. .................................... 296/106; 296/107; 49/248
[58] Field of Search .............. 296/50, 51, 56, 57 R, 296/106, 107; 49/246, 248

[56] References Cited

U.S. PATENT DOCUMENTS

| | | | |
|---|---|---|---|
| 2,391,813 | 12/1945 | Wood | 49/248 |
| 2,792,135 | 5/1957 | Wood | 296/56 |
| 3,167,349 | 1/1965 | Young et al. | 296/107 |
| 3,315,412 | 4/1967 | Hultgren | 49/246 |
| 3,713,472 | 1/1973 | Dozois | 296/56 X |
| 3,851,867 | 12/1974 | Fricko | 296/56 X |
| 3,917,343 | 11/1975 | Taylor et al. | 296/56 X |
| 4,118,131 | 10/1978 | Schnitzius | 296/56 X |

*Primary Examiner*—Dennis H. Pedder
*Attorney, Agent, or Firm*—John R. Benefiel

[57] ABSTRACT

A convertible top automobile is disclosed having a space for receiving the convertible top in the lowered position, in which a tail gate is provided, upwardly movable on a four bar linkage system, with support cylinders to afford unimpeded access to the receiving space through an end opening formed by the body portions.

4 Claims, 3 Drawing Sheets

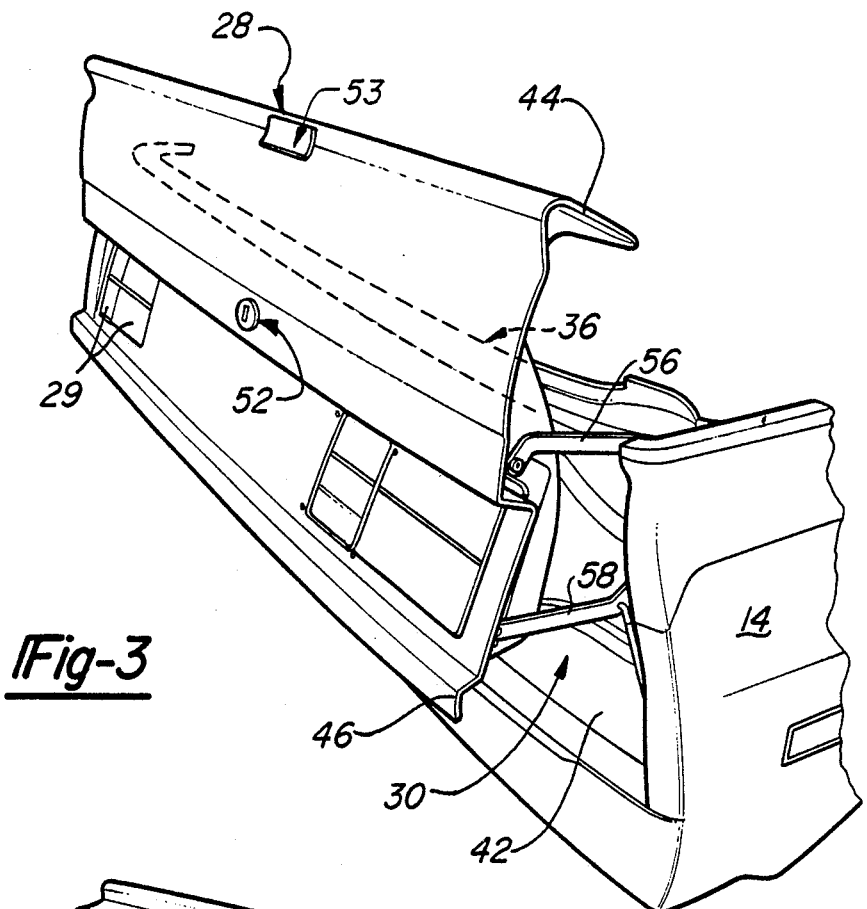
Fig-3
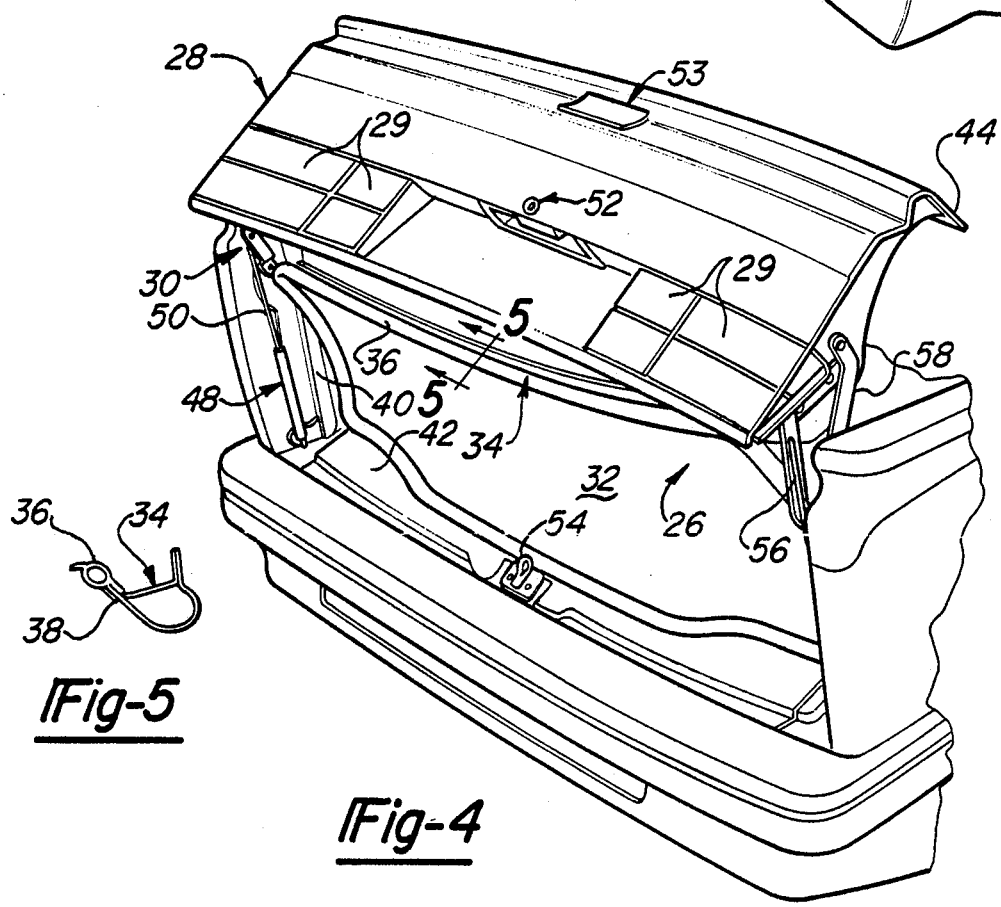
Fig-5
Fig-4

CONVERTIBLE TOP AUTOMOBILE WITH VERTICALLY MOVABLE TAIL GATE

BACKGROUND OF THE INVENTION

This invention concerns automobile bodies, and more particularly convertible top automobile bodies.

Automobiles typically are provided with trunks to enable storage of luggage or other items to be transported, with a hinged and locked trunk lid provided at the rear of the automobile body for this purpose.

In subcompact convertible top car models, the body space receiving the convertible top when folded down extends to the very rear of the auto body, precluding a conventional trunk space, and the resultant reduction in storage space is of course a distinct drawback to such car models.

The convertible top, even when folded down, does not occupy the full depth of the top receiving space, and whenever the top is up, this space could be used for storage space if there was convenient access thereto.

The present invention thus has as its object the provision of convenient access to the convertible top receiving space to be able to be used as a luggage space in car models of this type.

SUMMARY OF THE INVENTION

This and other objects of the present invention which will become apparent upon reading of the following specification and claims, are accomplished by a body configuration defining an end opening entering into the convertible top receiving space. The end opening is normally closed by a tail gate configured to blend to the body exterior contours, and carries the tail lights of the vehicle. The tail gate is able to be raised on a four bar linkage, allowing the tail gate to be vertically translated to clear the end opening and provide unimpeded access thereto. A pair of support cylinders allow the tail gate to be maintained in the raised position.

DESCRIPTION OF THE DRAWINGS

FIG. 3 is a fragmentary, side perspective view of the rear portions of the automobile shown in FIGS. 1 and 2 with the tail gate partially raised.

FIG. 4 is a fragmentary rear perspective view of the rear portion of the automobile shown in FIGS. 1-3, with the tail gate in the fully raised and open position.

FIG. 5 is a view of the section 5—5 taken in FIG. 4.

DETAILED DESCRIPTION

In the following detailed description, certain specific terminology will be employed for the sake of clarity, and a particular embodiment described in accordance with the requirements of 35 USC 112, but it is to be understood that the same is not intended to be limiting inasmuch as the invention is capable of taking many forms and variations within the scope of the appended claims.

Figure 1:
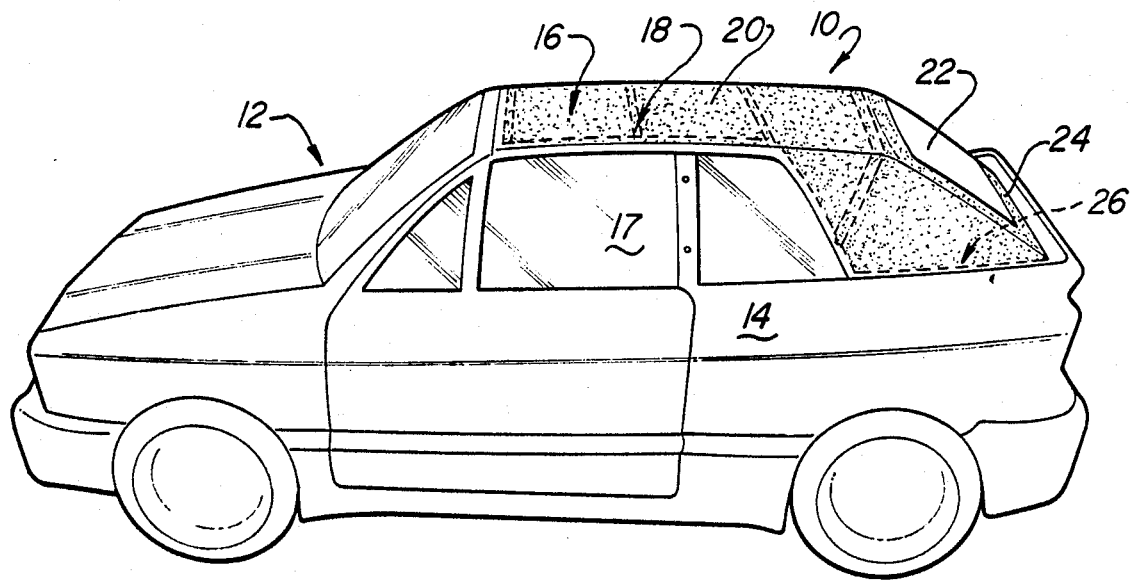
FIG. 1 is a side perspective view of a convertible top automobile of a type of which the present invention is an improvement.

Referring to FIG. 1, the automobile 10 of the type with which the present invention is concerned includes an automobile body 12, including body portions 14 together with a convertible top 16 defining a passenger compartment 17. The convertible top 16 includes a foldable frame 18 covered with a fabric covering 20 and rear window 22.

Reference is made to U.S. copending application Ser. No. 013,121, filed on Feb. 10, 1987, to the same inventor for a detailed description of a suitable frame mechanism, although the present invention may be employed with conventional convertible top mechanisms.

Figure 2:
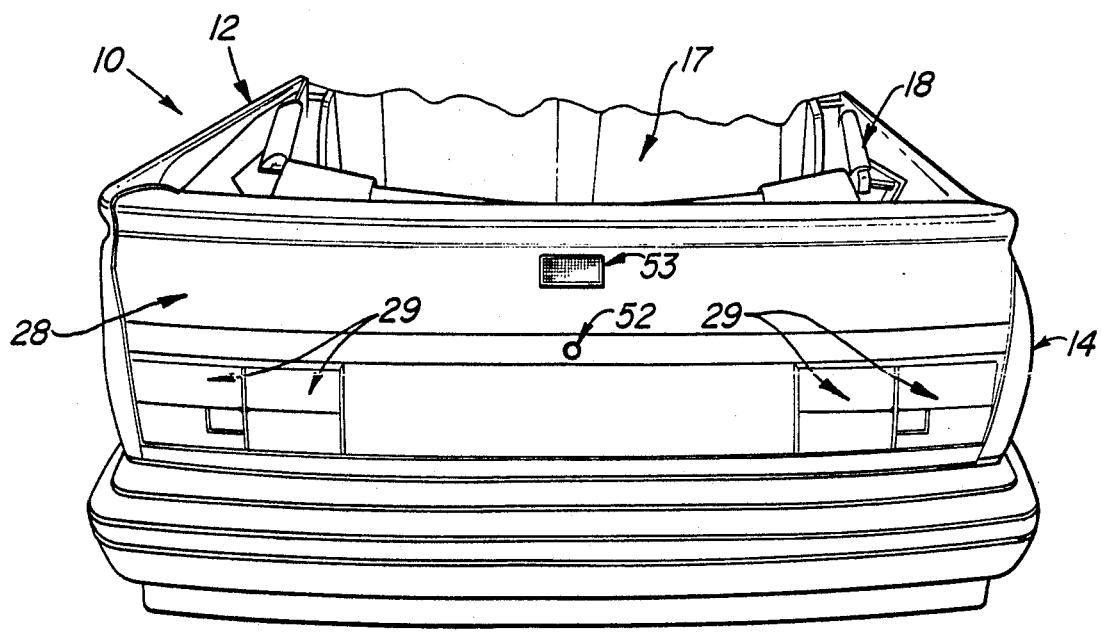
FIG. 2 is a fragmentary, rear perspective view of the automobile shown in FIG. 1, depicting the tail gate of the present invention in the normal, closed position.

As can be seen from FIG. 1, the top extends completely to the rear of the body 14. The fabric cover 20 of top 16 is secured about its lower periphery 24 and folds down into a receiving space 26 located beneath and forward of the rear periphery 24, as shown in FIG. 2.

According to the concept of the present invention, a tail gate 28 is provided which forms the rear section of body portions 14, contoured to blend with the other body portion contours, and carrying the tail lights 29 normally mounted in fixed body sections.

The tail gate 28 may be opened by initially being swung rearwardly slightly to be withdrawn from the body portions 14 and up on a four bar linkage system 30, secured to either side of the tail gate 28, initiation of this movement being depicted in FIG. 3.

As best seen in FIG. 4, an end opening is defined by body structure entering into the storage space 26, which end opening is opened and closed by the position of the tail gate 28. In the fully open position shown in FIG. 4, a completely unimpeded access is provided by the position of the tail gate 28 completely above end opening 32.

The end opening 32 is defined in part by an upper trough member 34, to which is affixed the lower periphery 24 of the fabric cover 20 with suitable fasteners (not shown).

A weather seal 36 is received on a lip 38 of the upper trough member 34 (FIG. 5), as well as side wall 40 and bottom pan 42 included in the body portion 14 to insure a weather tight seal of the tail gate 28 against the perimeter of end opening 32.

The tail gate 28 includes an upper lip 44 lapping over upper trough member 34 and a lower lip 46 over bottom pan 42 (FIG. 3).

A pair of support cylinders 48 of known construction are provided on either side of the end opening 32, having an operating rod 50 drivingly connected to a respective linkage system 30 to hold the tail gate 28 in the raised position shown in FIG. 4.

A suitable key lock 52 controls latching to a latch 54 affixed to the bottom pan 42, providing security for access to space 26. A handle 53 is also provided to be gripped in raising the tail gate 28.

Figure 6:
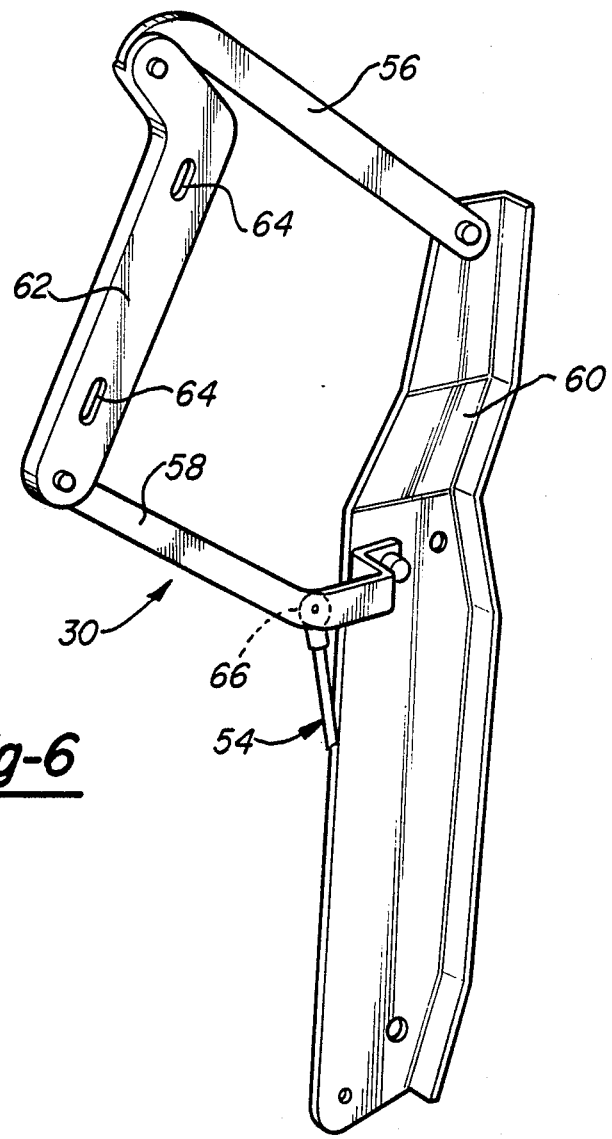
FIG. 6 is a side perspective view of the left hand parallel linkage used to mount the tail gate according to the present invention.

Each four bar linkage system 30 includes an upper and lower link 56, 58 parallel to each other in the position shown in FIGS. 3 and 6, each link 56, pivoted at one end to a mounting bracket 60 affixed to a side wall 40, and at the other end to a mounting link 62 affixed to a respective side wall of the tail gate 28 by suitable fasteners (not shown) received in slotted openings 64.

The support cylinder operating rods 54 are drivingly engaged to the lower link 58 at an intermediate point along the length thereof by means of a swivel socket 66 to accommodate changing angles occurring as the linkage is operated.

Each of the four bar linkages 30 are positioned with the upper and lower links 56, 58 downward with the tail gate 28 closed.

Upon initiation of opening, the links 56, 58 swing rearwardly to move the tail gate 28 away from the seal 36, and then swing upwardly to move the tail gate 28 completely clear of the end opening 34. In this position, the component of the weight of the tail gate 28 not supported on the link pivots is completely counterbalanced by the support cylinder 48, so that the tail gate 28 will remain raised until lowered.

The use of a four bar linkage system produces essentially translational movement of the tail gate 28 rather than hinging movement. This has the advantage of minimizing the required clearance adjacent the vehicle, and produces unimpeded access to end opening 32.

Accordingly, it can be appreciated that effective and convenient access to the storage space 26 is accomplished by a simple structure compatible with the styling of the automobile and with the structural arrangement of the particular convertible top automobiles of the type described.

I claim:

1. In a convertible top automobile of the type including a top comprised of a body attached frame and a fabric covering, said top rearwardly foldable into a receiving storage space formed in part by automobile body portions, said storage space extending to the rear of said automobile, the improvement comprising:

a vertically disposed end opening formed in said body portions at the rear of said automobile, said end opening having a fixed top and bottom member and side members, said end opening entering into said top receiving storage space;

said fabric covering having a rear edge attached to said fixed top member of said end opening;

a movable tail gate extending across the rear of said automobile body and configured to overlie said end opening against said top, sides, and bottom members thereof;

means for mounting said tail gate to be movable between a closed position overlying said end opening and an open position, uncovering said end opening to enable selective access to said top receiving storage space through said end opening.

2. The convertible top automobile according to claim 1 wherein said means mounting said tail gate comprises a pair of four bar linkage systems, each mounted to one side of said tail gate, each of said four bar linkage systems comprised of a pair of links each connected at one end to one of the sides of said end opening and at the other end to said tail gate.

3. The convertible top automobile according to claim 2 wherein each of said four bar linkage systems are arranged to allow said tail gate to be initially translated to the rear and thereafter upwardly in moving from said closed position to said opening position.

4. The convertible top automobile according to claim 3 further including a pair of support cylinders each having an operating rod engaging one of said links of each four bar linkage system and arranged to support the weight of said tail gate in the open position thereof

* * * * *